United States Patent
Nakatsukasa et al.

(10) Patent No.: US 6,261,371 B1
(45) Date of Patent: Jul. 17, 2001

(54) SEED COATING APPARATUS

(75) Inventors: Kazushi Nakatsukasa; Yasushi Kohno; Takamichi Maejima, all of Himeji (JP)

(73) Assignee: Agritecno Yazaki Co., Ltd., Hyogo (JP)

( * ) Notice: Subject to any disclaimer, the term of this patent is extended or adjusted under 35 U.S.C. 154(b) by 0 days.

(21) Appl. No.: 09/294,942

(22) Filed: Apr. 20, 1999

(30) Foreign Application Priority Data

Apr. 20, 1998 (JP) .................................................. 10-109815

(51) Int. Cl.[7] ...................................................... B05C 5/02
(52) U.S. Cl. .............................................. 118/684; 118/13
(58) Field of Search .................................. 118/13, 16, 17, 118/29, 30, 305, 500, 407, 684; 427/4, 212, 337, 430.1; 137/861, 862, 869; 111/905, 917

(56) References Cited

U.S. PATENT DOCUMENTS

| | | | |
|---|---|---|---|
| 4,597,412 | * 7/1986 | Stark | 137/606 |
| 5,085,402 | * 2/1992 | O'Dell | 251/129.21 |
| 5,728,218 | * 3/1998 | Kohno et al. | 118/13 |
| 6,048,571 | * 4/2000 | Kohno et al. | 427/4 |

FOREIGN PATENT DOCUMENTS 9-149711    6/1997    (JP) .

* cited by examiner

Primary Examiner—Mark A. Osele
Assistant Examiner—Yewebdar T Tadesse
(74) Attorney, Agent, or Firm—Knobbe, Martens, Olson & Bear LLP.

(57) ABSTRACT

A seed coating apparatus comprises a seed supplying unit, a coating unit, a hardening unit and a washing unit assembled in series. The coating unit is provided with an exchangeable nozzle block having the nozzles and with passages for respectively feeding the nozzles with gelling solution. All the passages are simultaneously blocked-and-resumed by two valves, which slidably cross the passages at upstream and downstream portions thereof. Each nozzle is supplied therein with a seed through a cylinder disposed at the center thereof and with gelling solution from the passage flowing toward the cylinder through discharge ports in opposite to each other. Holes of the nozzles for dropping the gel-coated seeds to the hardening unit are closed by a shutter after the gel-coated seeds are dropped therefrom.

8 Claims, 14 Drawing Sheets

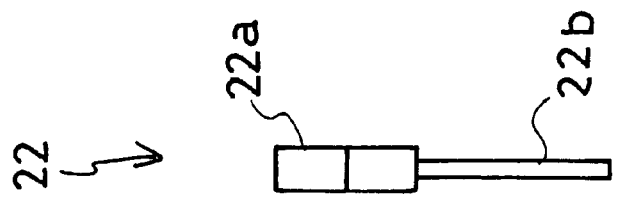
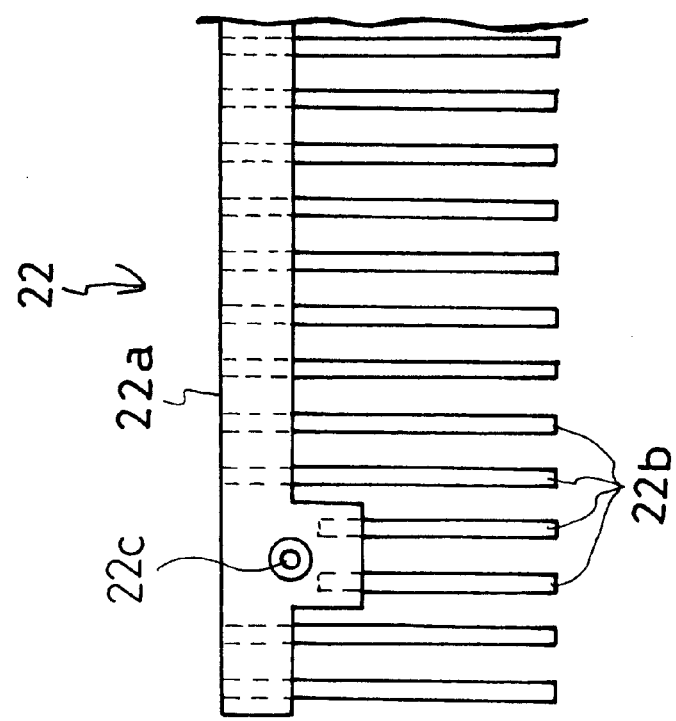

Fig. 14
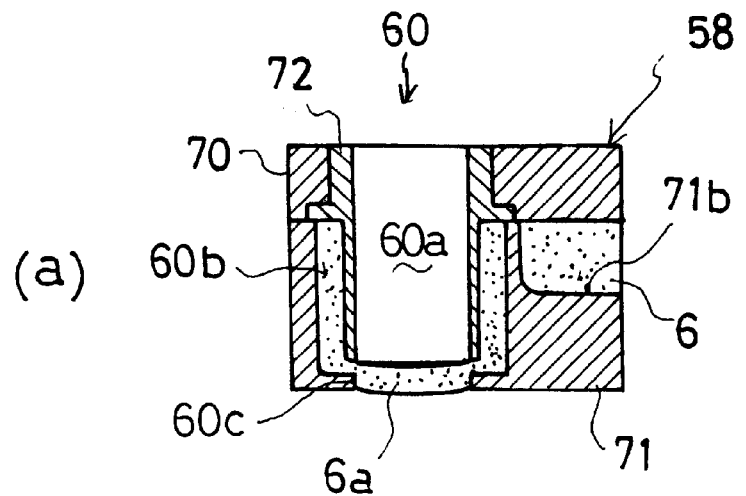
(a)
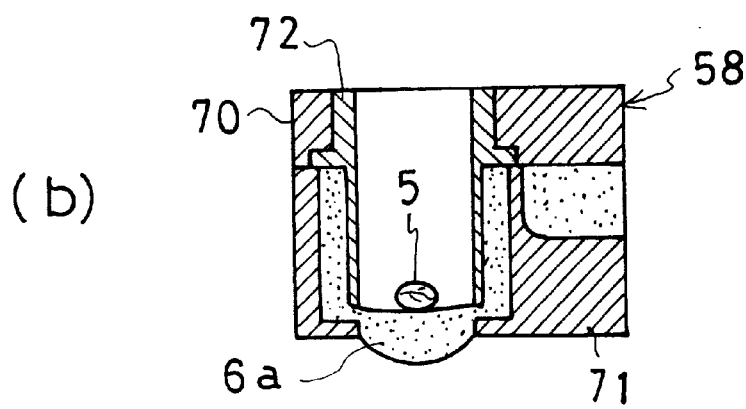
(b)
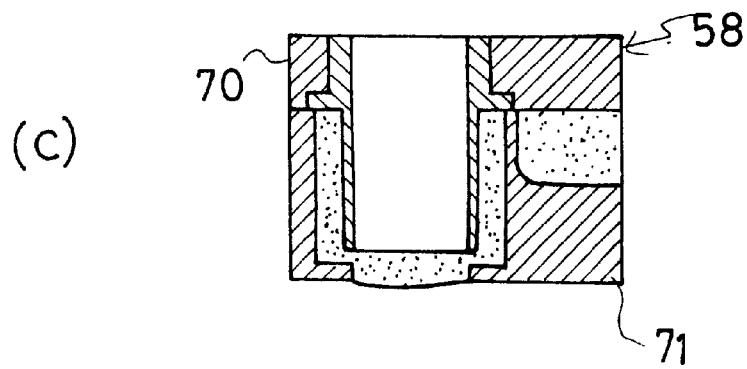
(c)
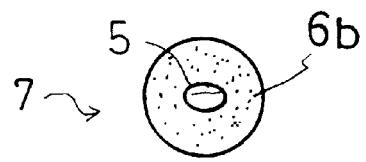

SEED COATING APPARATUS

BACKGROUND OF THE INVENTION

1. Field of the Invention

The present invention relates to a novel and improved apparatus for coating seeds with gel, particularly which can produce a plurality of gel-coated seeds simlutaneously.

2. Related Art

Japanese Laid Open Gazette No. Hei 9-149,711, for example, discloses a well-known conventional apparatus for coating small seeds with gelling solution mixed together with nutrition, medicine and the like, wherein seeds are sucked to a plurality of sucking chips respectively, carried to the above portion of processing nozzles by the movement of the sucking nozzles and released into the respective nozzles. Each of the nozzles is previously fed therein with gelling solution so as to form a gel-membrane therein for receiving the released seed, thereby coating the seed with the gelling solution. In the same apparatus, the gel-coated seeds are dropped into hardening solution in a tank so as to be conveyed therein by the movement of paddles while the gel-coat thereof being hardened, and then are dropped into water or other washing liquid in another tank so as to be conveyed therein by a screw-typed conveyor while the hardening solution stuck to the outer surface thereof being washed out.

The above-said conventional seed coating apparatus with gel has included some problems as follows:

The apparatus has been able to processes only small seeds. Large seeds have been processed by a different apparatus.

The sucking chips have been moved by actuators consisting of a horizontally moving cylinder and a vertically moving cylinder, so that there has been such a fear that the seeds carried by the sucking chips fall down by an inertial force at the intermediate of its carriage course where the carrying direction is changed. Additionally, the seed carrying means having such cylinders is complicated.

The flow of gelling solution fed into each nozzle has been substantially horizontally oneway, so that when it was excessively pressurized, there has been a fear of deviation of the gel-membrane from its determined portion by the pressure. It has also caused the deviation of the gel-coated seed dropped between the nozzle and the hardening unit from its determined arrival portion in the hardening unit, so that the dropped gel-coated seed has hit its soft gel-coat against the paddle. On seeding, the resultant unevenly gel-coated seeds are sent through a hose or a seeding machine while rubbing against one another, thereby causing the inner seeds to be removed from the gel-coats or to be injured.

The conveyors of the hardening unit and the washing unit has been mechanically different from each other as the above mentioned, thereby expensively increasing the kinds of parts. Additionally, the paddle of the hardening unit has been made of a plate bored by a plurality of slits for allowance of the hardening solution to pass therethrough, which has been laterally united at the upper and lower ends thereof in perpendicular to its conveyance direction, thereby causing its resistance against the hardening solution so as to push out the hardening solution together with the gel-coated seeds through a seed discharge hole of the hardening unit.

SUMMARY OF THE INVENTION

Regarding to a seed coating apparatus including a seed stocker, a plurality of seed holders for catching seeds from the seed stocker respectively, a seed holder block integrally provided with the seed holders, a plurality of nozzles for seed coating as many as the seed holders, a nozzle block integrally provided with the nozzles, and a seed carrying means for moving the seed holder block between the seed stocker and the nozzle block so as to carry seeds caught on the seed holders to the nozzles respectively, the first object of the present invention is to enable the seed coating apparatus to process every sized seed whether it is extremely small or large, thereby reducing the tooling cost for production of coated seeds.

For attainment of the first objection, the seed holder block can be replaced another seed holder block having different seed holders in correspondence to the size of seed to be held, the nozzle block can be replaced with another nozzle block having different nozzles in correspondence to the size of seeds to be coated, and the position of the seed carrying means can be changed so as to change the distance between the seed holders and the seed stocker.

Due to the exchangeability of the seed holder block and the nozzle block, the apparatus can process any sized (either small or large) seed, so that it is unnecessary to provide individual apparatuses for small seeds and large seeds. Also, due to the adjustability of the position of the seed carrying means, the seeds on the seed stocker are prevented from crashing by the seed holders or missing to be caught by the same.

The second object of the present invention regarding to a seed resuming-and-blocking of the downstream portions are simultaneously performed.

Accordingly, it comes to be unnecessary to provide the passages with individual valves respectively, thereby simplifying the construction and control of valves for the feeding of gelling solution and reducing the cost thereof. The integral first and second valves slidably crossing all the passages have mechanical errors less than a ball-type valve, thereby being prevented from an escape of gelling solution and enabling a constant quantity of gelling solution to be discharged to each nozzle. Also, they make the gelling solution simultaneously flowing through all the passages constant in quantity and term, thereby producing constant sized gel-coated seeds.

The fourth object of the present invention regarding to the seed coating apparatus including a plurality of nozzles supplied therein with seeds and gelling solution respectively for coating the seeds with the gelling solution, each of the nozzles being provided with a hole for dropping a seed coated with gelling solution, is to prevent the gelling solution in the nozzles from a splash of hardening liquid raised from a hardening unit disposed below the nozzles for hardening the gel-coats of seeds.

For attainment of the fourth object, the holes of the nozzles for dropping the gel-coated seeds to the hardening solution tank are opened-and-closed by a shutter. The shutter closes all the holes of the nozzles as soon as the gel-coated seeds are dropped from the holes.

The fifth object of the present invention regarding to the similar seed coating apparatus including the first and second valves and the shutter is to interlock the valves and shutter properly, thereby simplifying the control system of them and making it less expensive.

For attainment of the fifth object, the first and second valves and coating apparatus including a seed stocker, a nozzle for coating a seed therein, and a seed carrying means for carrying seeds on the seed stocker to the nozzle, is to simplify the mechanism and control of the seed carrying means for cost reduction or compacting and to simplify the carriage course thereof for preventing the seeds carried by the moving seed carrying means from falling down when the seed carrying means changes its carriage direction.

For attainment of the second object, the carrying means is directed vertically slantwise, so that the carriage distance is reduced and the change of carriage direction vanishes, thereby reducing the vibration generated on the moving seed carrying means.

Regarding to a seed coating apparatus including a plurality of parallel nozzles supplied therein with seeds and gelling solution respectively for coating the seeds with the gelling solution, and a plurality of parallel passages for respectively feeding the nozzles with gelling solution, the third object of the present invention is to simplify the control mechanism for simultaneously feeding all the nozzles with the gelling solution and to even the feeding of gelling solution to all the nozzles for diminishing the qualitative variation of gel-coated seeds or reducing defective pieces.

For attainment of the third object, a single elongated first valve axially slidably crosses upstream portions of all the passages so as to block-and-resume the upstream portions, a single second valve slidably crosses downstream portions of all the passages so as to resume-and-block the downstream portions, a plurality of plungers are disposed respectively in the passages between the first and second valves for pushing out the gelling solution to the nozzles, and the first and second valves are joined with each other so as to slide together, so that the blocking-and-resuming of the upstream portions and the the shutter are joined together, so that the blocking-and-resuming of the upstream portions, the resuming-and-blocking of the downstream portions and the opening-and-closing of the openings of the nozzles are simultaneously performed. Accordingly, only one power source is required to operate the valves and shutter.

The sixth object of the present invention regarding to a seed coating apparatus including a nozzle supplied therein with a seed and gelling solution for coating the seed with the gelling solution, and a plunger for pushing out gelling solution to the nozzle, is to improve the control of feeding the nozzles with gelling solution so that a gel-membrane is formed in the nozzle with reliability before the supplying of seeds for making sure that the gel-membranes are expanded after the seeds being provided thereon so as to make gel-coated seeds and drop them with their own weight.

For attainment of the sixth object, the plunger is actuated in several steps. At the first step, it is actuated a little so as to feed the nozzle with some gelling solution, thereby forming gel-membranes therein. In the further steps, the plunger feeds the nozzle with the more gelling solution, so as to increase the thickness of gel-membrane, and finally drop it with a seed by its own weight.

The seventh object of the present invention regarding the same apparatus is to avoid the oneway feeding of gelling solution to the nozzle for making a properly formed gel-coated seed in the nozzle.

For attainment of the seventh object, a cylindrical member is provided in the center of the nozzle for allowance of a seed to pass therethrough, and gel discharge ports for discharging gelling solution to the nozzle are disposed in opposite to each other with respect to an axis of said cylindrical member. Accordingly, the flows of gelling solution discharged from the gel discharge ports to the nozzle counteract each other. Hence, the cylindrical member is not eccentrically pressed by a flow of gelling solution, so that the seed through the cylindrical member can be received by the gel-membrane at its predetermined position. Also, the gel-membrane can be made even in thickness and the gel-coated seed can be properly dropped from the nozzle to the predetermined portion in the hardening unit, thereby improving the reliability of nice products.

The eighth object of the present invention, regarding to a seed coating apparatus including a hardening unit for hardening a gel-coat of a seed and a washing unit for washing out hardening liquid stuck to a surface of a gel-coat of a seed, is to diminish the resistance of seed pushing members of conveyors of the hardening and washing units against the liquids, for preventing the liquids from being pushed out together with the discharged gel-coated seeds.

For attainment of the eighth object, a plurality of parallel pushing members in comb-like shapes consisting of a frame and teeth projecting from the frame are moved by each of the conveyors for pushing a seed coated with gel in either hardening liquid or washing liquid. The frame is substantially as long as the inner width of the tank and is directed in perpendicular to the conveyance direction of the conveyor.

Moreover, for providing the hardening and washing units with common parts, the same tank and conveyor are provided for both the units.

The ninth object of the present invention is to improve the above constructed hardening unit so as to be surely supplied at the predetermined portion thereof with the gel-coated seeds dropped from the nozzles without hitting the seed pushing members.

For attainment of the ninth object, the conveyor of the hardening unit is intermittently driven so that a seed coated with gel is supplied into a space between the seed pushing members at the interval of the conveyor.

BRIEF DESCRIPTION OF THE DRAWINGS

FIG. 13(*a*) is a side view of a paddle for conveying seeds in the hardening and a washing units, and FIG. 13(*b*) is a front view of the same;

FIGS. 14(*a*)–(*c*) illustrate a series of seed coating process of a nozzle of the coating unit viewed in sectional front.

DETAILED DESCRIPTION OF THE PREFERRED EMBODIMENT

Figure 1:
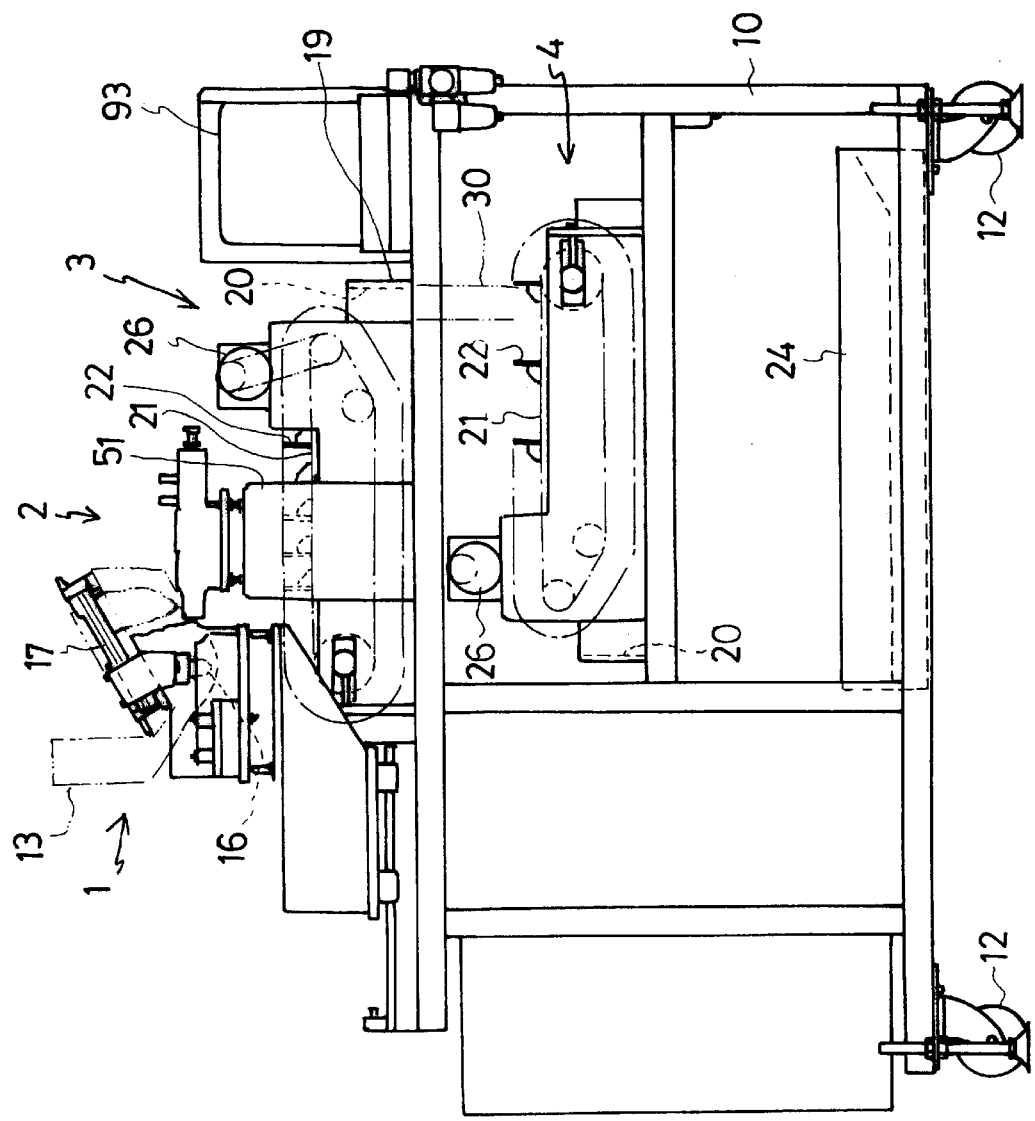
FIG. 1 is a front view of a seed coating apparatus with gel according to the present invention.

At first, general explanation will be given on an entire construction of a seed coating apparatus with gel of the present invention according to FIGS. 1, 2 and 3.

The seed coating apparatus consists of a seed supplying unit 1, a coating unit 2, a hardening unit 3 and a washing unit 4, all of which are supported by a cabinet 10 having casters 12.

The seed supplying unit 1 has a hopper 13, sucking chips (seed holders) 16 and a seed carrying means 17 for moving the sucking chips 16. The coating unit 2 located above the center of the cabinet 10 receives seeds 5 (shown in FIG. 14) from the seed supplying unit 1, coats seeds 5 with gelling solution 6 (shown in FIG. 14) so as to swell them to the predetermined size, and drop them.

The hardening unit 3 includes a liquid tank 19, which is filled with hardening liquid, extended rightwardly from the place just under nozzles 60 (shown in FIG. 7 or others) of the coating unit 2. The tank 19 is provided at the right end thereof (laterally opposite to the nozzles 60 of coating unit 2) with a seed discharge hole 20. Conveyor belts 21 are parallely disposed front and rear in the tank 19 and are provided on their outer surfaces with a plurality of regularly spaced paddles (seed pushing members) 22 projecting in perpendicular to the conveying direction of the conveyor belts 21. The conveyor belts 21 are driven by a motor 26.

Soft gel-coated seeds 7 (shown in FIGS. 11 and 14) are dropped from the coating unit 2 into the tank 19 to be sunk in the hardening liquid therein. The gel-coated seeds 7 are conveyed in the tank 19 by the rotary driving of the conveyor belts 21 having the paddles 22, while the gel-coats 6b (shown in FIG. 14) of the gel-coasted seeds 7 being hardened by the hardening liquid, and finally discharged through the seed discharge hole 20 to the washing unit 4. The span of time for hardening can be changed by the change of rotary speed of the motor 26, thereby enabling the degree of hardness of the gel-coats 6b of the gel-coated seeds 7 to be adjusted.

The washing unit 4 is located substantially at the center of the cabinet 10, and extended leftwardly from the place just under the seed discharge hole 20 of the hardening unit 3. Similarly to the hardening unit 3, the washing unit 4 is provided with the liquid tank 19, the seed discharge hole 20, the conveyor belts 21, the paddles 22, the motor 26, and other common parts, so that a unit serving as the hardening unit 3 can also be used as the washing unit 4.

The gel-coated seeds 7 dropped from the seed discharge hole 20 of the hardening unit 3 through a guide tube 30 fall into a right end portion of the tank 19 of the washing unit 4 so as to be sunk in water (or other washing liquid) therein. While the gel-coated seeds 7 are conveyed in the tank 19 by the paddles 22 of the conveyor belts 21 driven by the motor 26, the water washes out the hardening liquid stuck to the surfaces of the gel-coats 6b of the gel-coated seeds 7, thereby stopping the advancing of hardening of the gel-coats 6b.

A product container 24 is disposed below the washing unit 4 so as to receive the gel-coated seeds 7 as finally products dropped from the seed discharge hole 20 of the washing unit 4.

Detailed explanation will be given on each of the seed supplying unit 1, coating unit 2, the hardening unit 3 and the washing unit 4.

Figure 4:
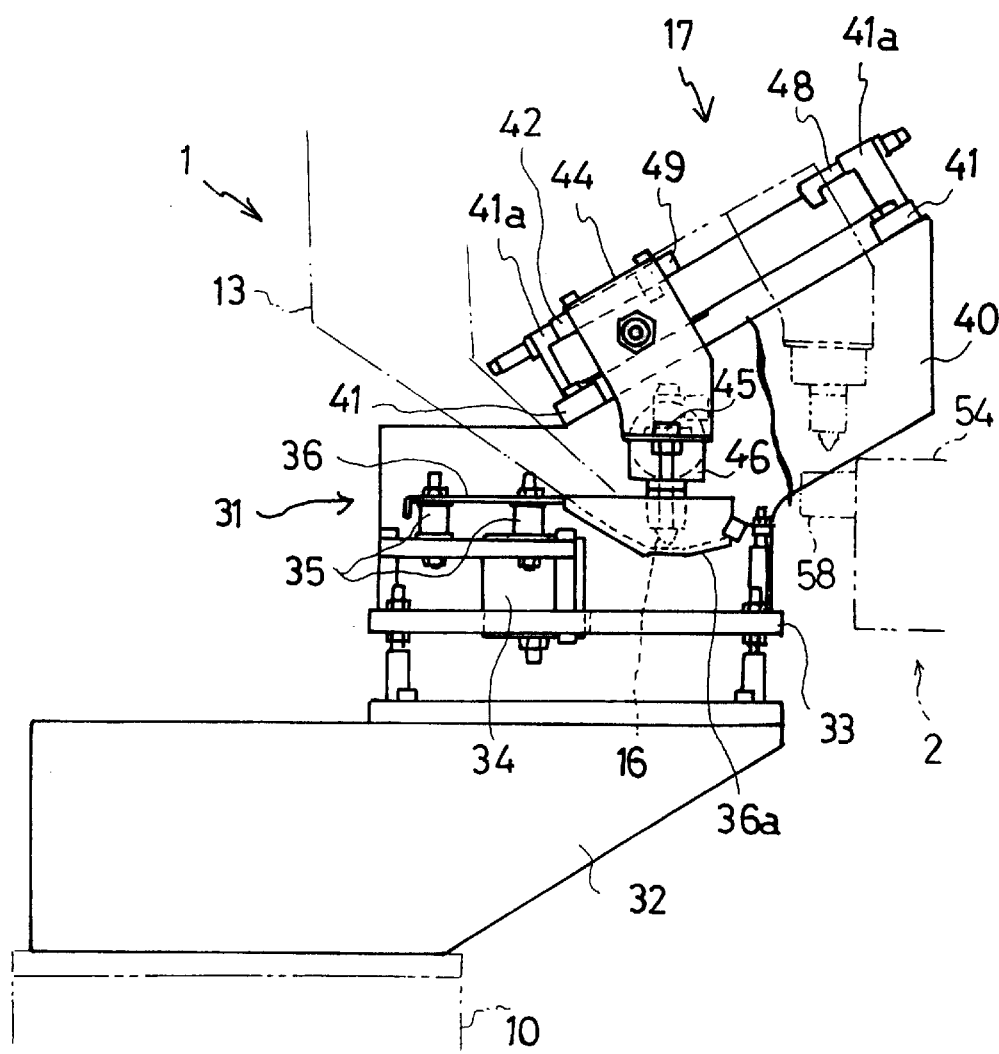
FIG. 4 is a front view of a seed supplying unit in the apparatus.
Figure 5:
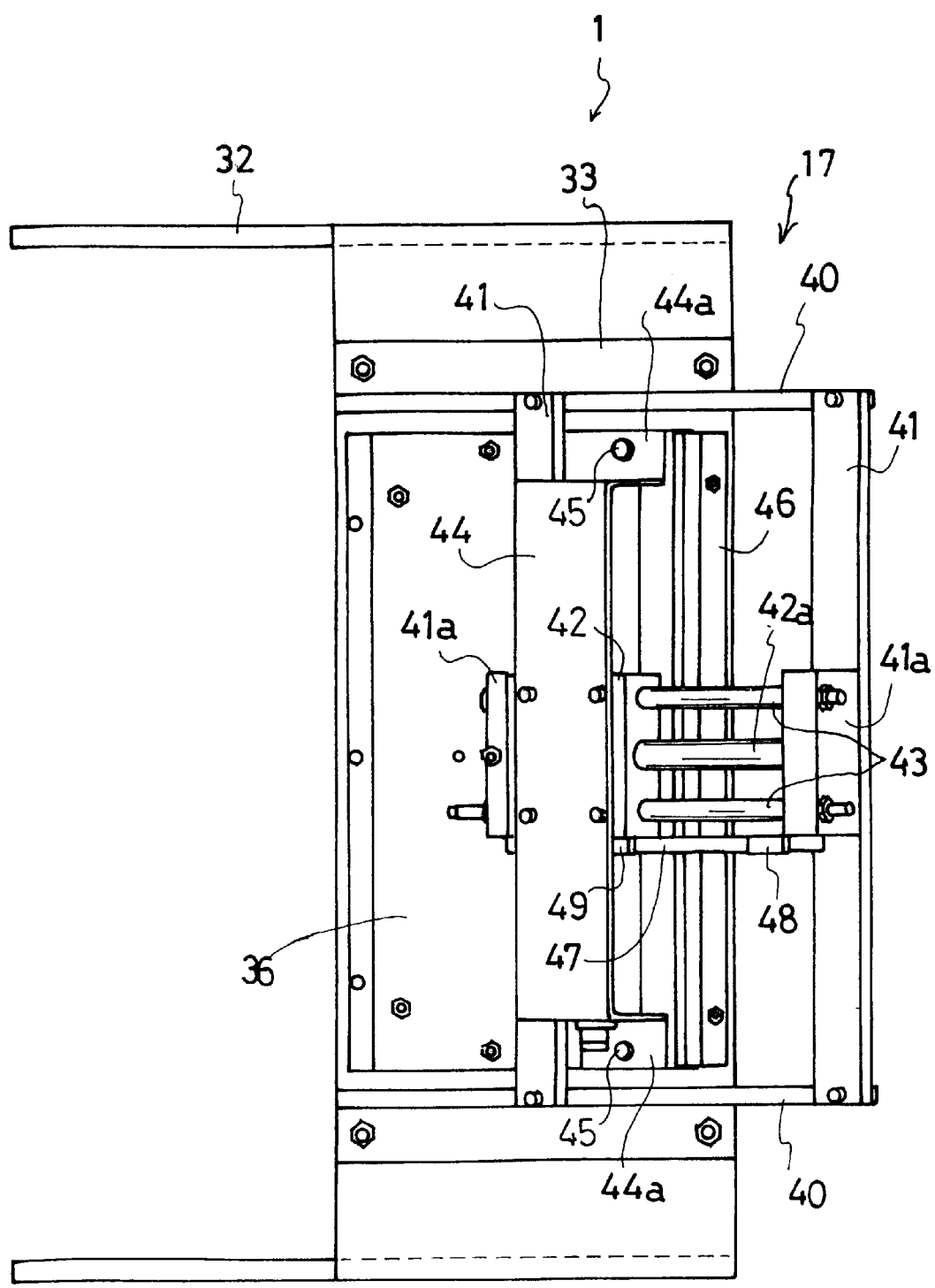
FIG. 5 is a plan view of the same.
Figure 6:
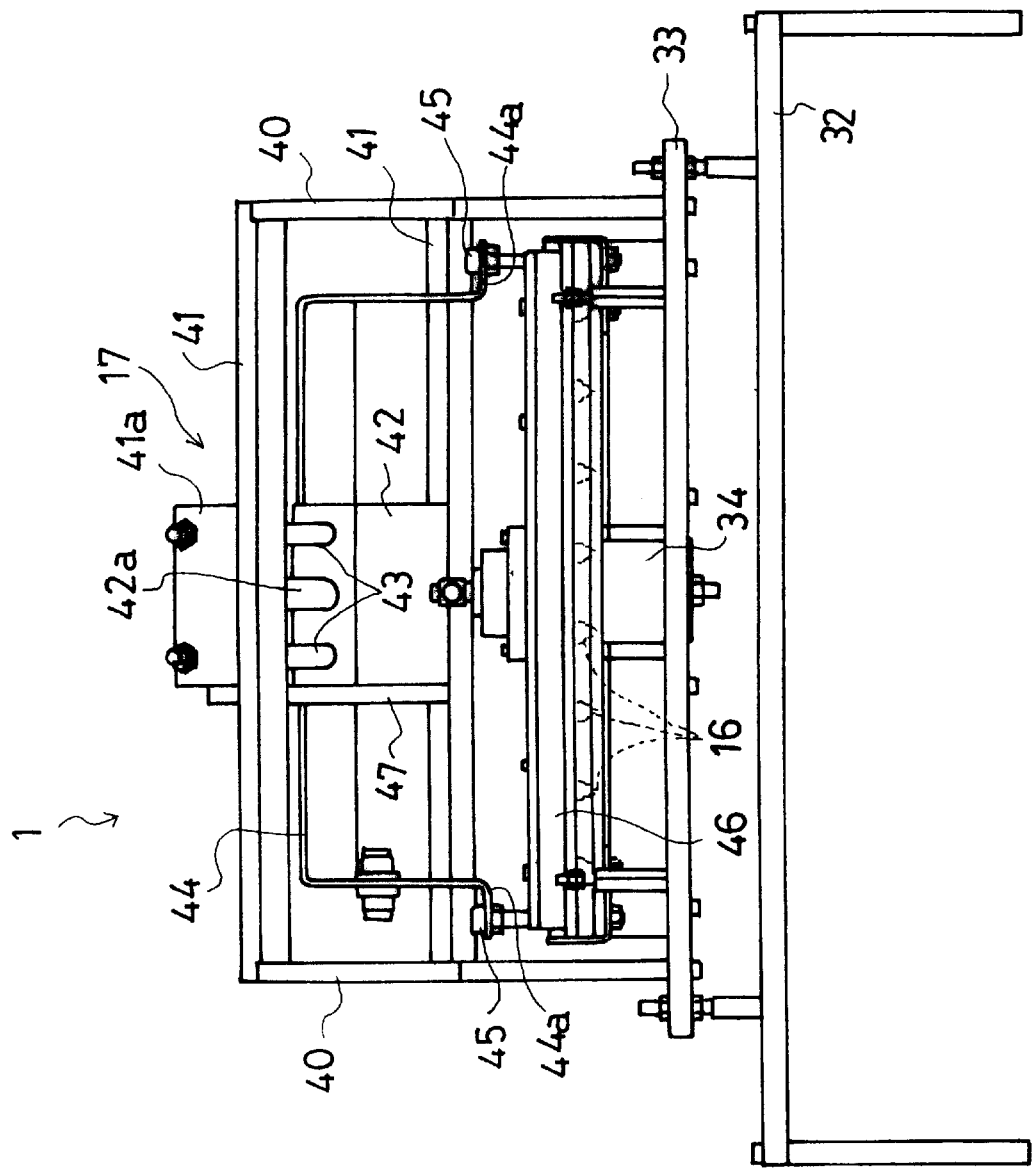
FIG. 6 is a side view of the same.

Referring to the seed supplying unit 1 shown in FIGS. 4 through 6, a seed stocker 31 is disposed leftwardly downward from the seed carrying means 17, so that the seeds 5 from the hopper 13 are stored to some quantity on the stocker 31 so as to be easily sucked one by one onto the respective sucking chips 16 of the seed carrying means 17. In this regard, a frame 32 is fixed on the top of the cabinet 10. A support base 33 is fastened onto the frame 32 through bolts and nuts so as to be adjustable in height. A vibrating plate 36 is disposed above the support base 33. A vibrator 34, which is electric-powered, for example, is fixed at the bottom thereof onto the support base 33 and an upwardly projecting vibrating member of the vibrator 34 is fixed to the vibrating plate 36. Rubber isolators 35 are interposed between the support base 34 and the vibrating plate 36. A downwardly recessed portion 36a formed by the right portion of the vibrating plate 36 faces a downwardly extending discharge opening 13a of the hopper 13.

The seeds 5 in the hopper 13 fall through the discharge opening 13a into the recessed portion 36a of the vibrating plate 36. The vibration of the vibrating plate 36 by the driving of the vibrator 34 makes the seeds 5 in the recessed portion 36a float and apart, so that the seeds 5 can be easily sucked onto the sucking chips 16.

Regarding to the seed carrying means 17, a pair of upwardly rightward extending plates 40 are erected front and rear in parallel on the support base 33. A pair of support frames 41 are longitudinally interposed left and right in parallel between the tops of the front and rear plates 40. A stay 41a is mounted on the longitudinal center of each support frame 41. A pair of guide rods 43 slidably passing through a sucking chip moving cylinder 42 are fixedly interposed rightwardly upward slantwise in parallel between both the stays 41a. The cylinder 42 has a piston rod 42a parallely extending between the guide rods 43, which is fixed either or both of the stays 41a. A bracket 44, which is a plate bent in anΩ-like shape when viewed in side, is fixed at the longitudinal center thereof to the upper surface of the cylinder 42.

A sensor mounting plate 47 is fixedly interposed between the front surfaces of the stays 41a. It may also be interposed between the rear surfaces of the stays 41a. On the top surface of sensor mounting plate 47, a position sensor 48 is mounted on the lower left portion thereof, and a position sensor 49 on the upper right portion thereof, so that the position sensors 48 and 49 made of proximity switches detect the respective lowest and highest positions of slanting movement of the cylinder 42 or the sucking chips 16. As a result, the seed carrying means 17 of the present invention is provided with only the cylinder 42 serving as an actuator for carrying seeds, which moves vertically slantwise.

A sucking chip block (seed holder block) 46 is disposed under the bracket 44. A height adjusting bolt 45 is downwardly inserted through a hole bored through each of front and rear edges 44a of the bracket 44 and is screwed into each of front and rear female screws bored in the sucking chip block 46. The bolt 45 is fastened to each of the edges 44a by a nut. The height of the sucking chip block 46 in relation to the bracket 44 can be adjusted by rotating operation of the bolts 45.

The sucking chip block 46 is integrally provided with a plurality of downwardly projecting sucking chips 16 having regular intervals in a longitudinal row. The number of sucking chips 16 to be provided on the sucking chop block 46 is not limited. According to this embodiment, eight sucking chips 16 are provided in correspondence to the number of the nozzles 60 of the coating unit 2. The sucking chip block 46 is connected to a vacuum pump (not shown) through a hose for the evacuation of the interior of the carrier block 46, thereby enabling the seeds 5 stored in the recessed portion 36a of the vibrating plate 36 to be sucked onto lower end openings of the sucking chips 16 respectively.

The sucking chip block 46 having the sucking chips 16 can be replaced with another sucking chip block 46 having different sized or shaped sucking chips 16 so as to fit seeds 5 in size or shape. As a result, the seed coating apparatus using the same seed supply unit 1 except the sucking chip block 46 can be fitted to various seeds in size, whether they are minute or large.

If the distance between the lower ends of the sucking chips 16 and the upper surface of the recessed portion 36a were too short, the lower ends of the sucking chips 16 would crush the seeds 5 on the recessed portion 36a. If the distance were too long, the lower ends of the sucking chips 16 would come apart from the top surface of seeds 5 in the recessed portion 36a, so that the seeds 5 could not be sucked thereto. Then, on every exchanging of the sucking chip block 46, or on every exchanging of seeds to be processed between different sized types while using the same sucking chip block 46, the bolts 45 are rotated for adjusting the height of the sucking chip block 46, so that the above said distance becomes just right for the seeds 5 to be sucked.

Additionally, a thrust pin is reciprocally contained in each of the sucking chips 16 so that it projects outwardly from the lower end opening of the sucking chips 16 on the releasing of the seed 5 to the nozzle 60 of the coating unit 2.

Referring to a series of process by the seed carrying means 17 in the seed supplying unit 1, firstly, the sucking chips 16 of the sucking chip block 46 are located above the recessed portion 36a by the motion of the cylinder 42 and the detecting of the position sensor 49. The vacuum pump evacuates the interior of the sucking chip block 46 so that the seeds 5 are stuck to the lower ends of the sucking chips 16 respectively. Then, the cylinder 42 is actuated so as to move the sucking chip block 46 upwardly slantwise. When the sucking chip block 46 reaches the upper end of its movement, the position sensor 48 detects it, thereby stopping the cylinder 42. Finally, the evacuation by the vacuum pump is stopped and the thrust pins are extended outwardly from the respective sucking chips 16, thereby forcibly releasing the stuck seeds 5 into the respective nozzles 60 of the coating unit 2. Then, the seed carrying means 17 repeats the same process.

The conventional seed supplying unit has used a combination of a vertically-motive actuator and a horizontally-motive actuator for carrying the sucking chips, thereby being expensive and complicated. Furthermore, the long carriage distance and the intermediate change of carriage direction has caused high possibility of falling down of the seeds on the moving sucking chips. The seed carrying means 17 of the present invention has only the cylinder 42 for carrying the sucking chips 16, thereby reducing the number and cost of parts. The cylinder 42 moves straightly vertically slantwise so as to shorten the carriage distance thereof and dismiss the shocking change of carriage direction, thereby enabling the seeds 5 to be carried smoothly without falling down on the way. Additionally, the shape of the vibrating plate 36 and the position of a nozzle block 58 having the nozzles 60 are improved considering the slant moving direction of the sucking chips 16.

Figure 7:
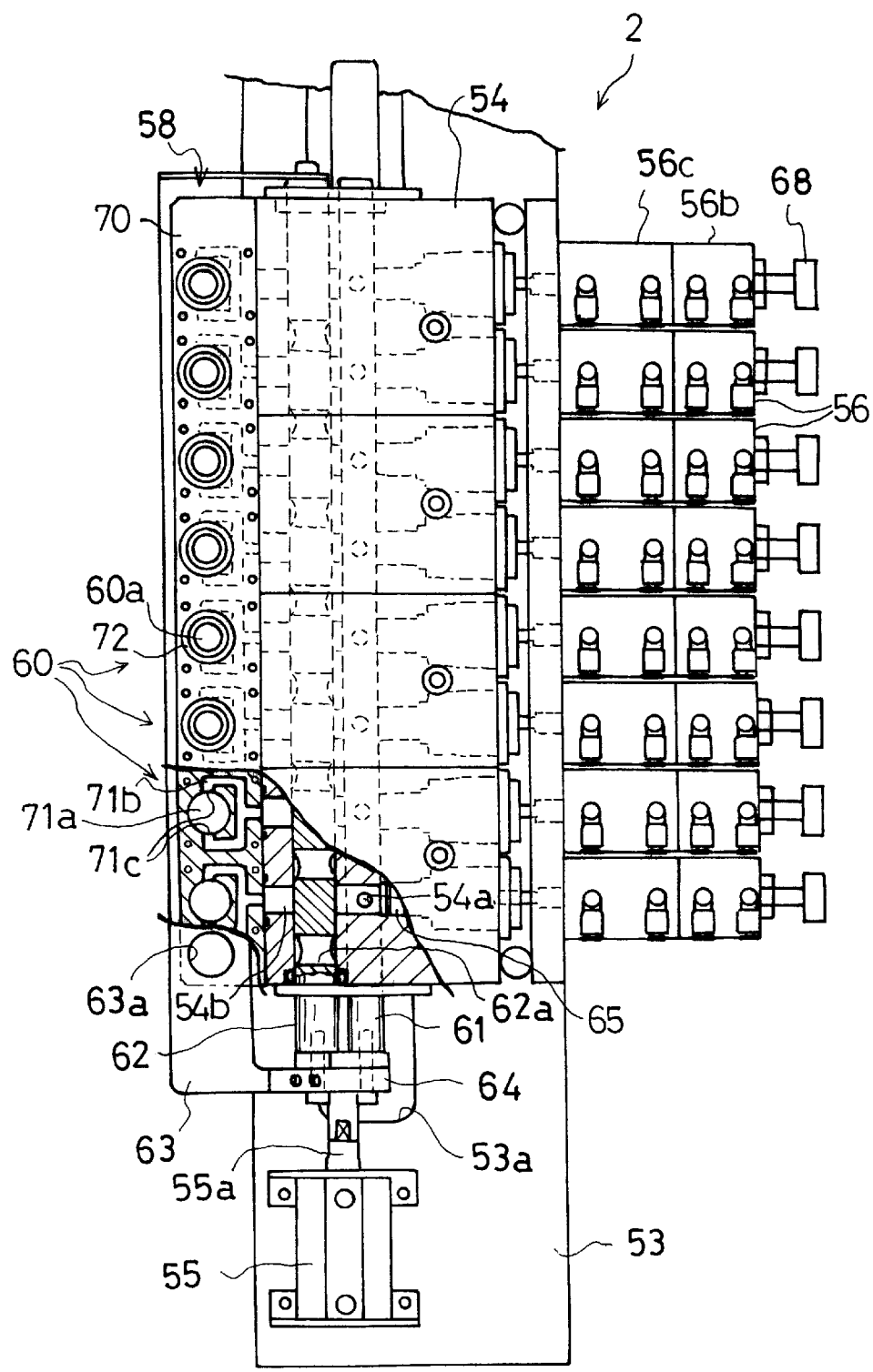
FIG. 7 is a plan view partly in section of a coating unit in the apparatus.
Figure 8:
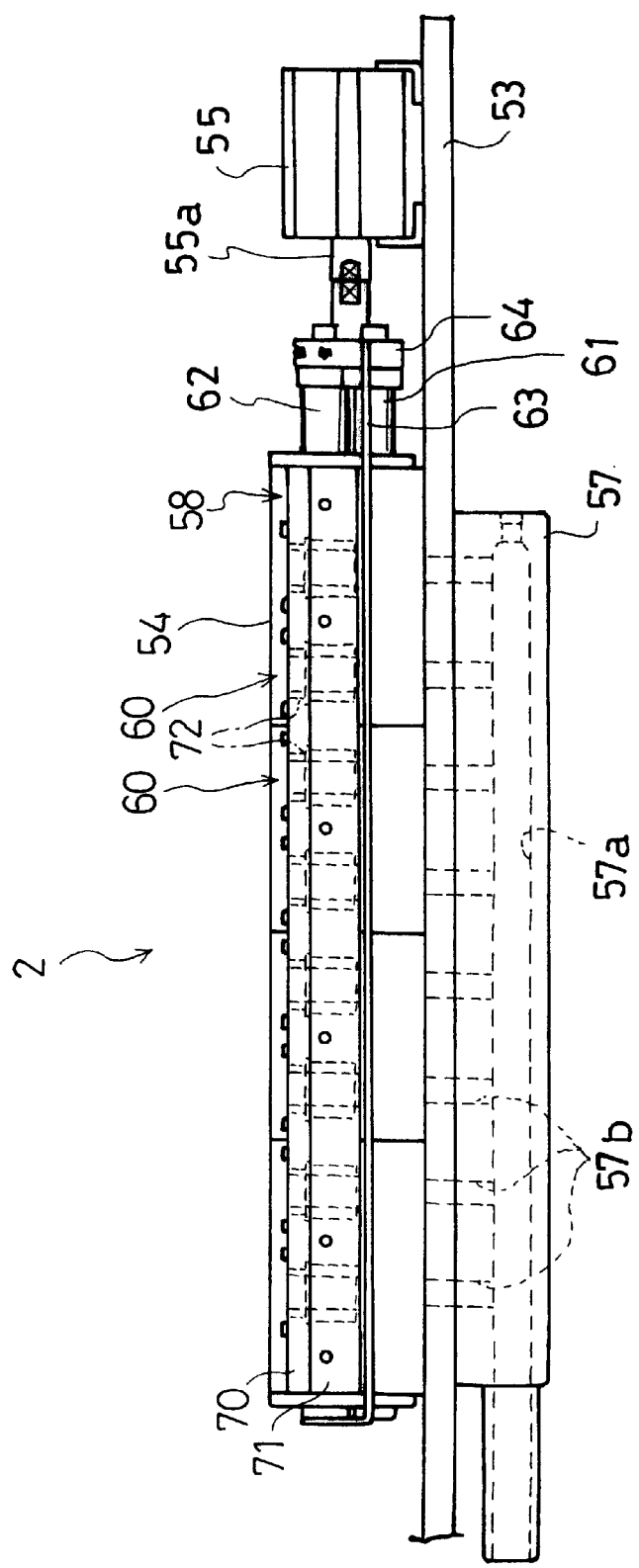
FIG. 8 is a side view of the same.
Figure 9:
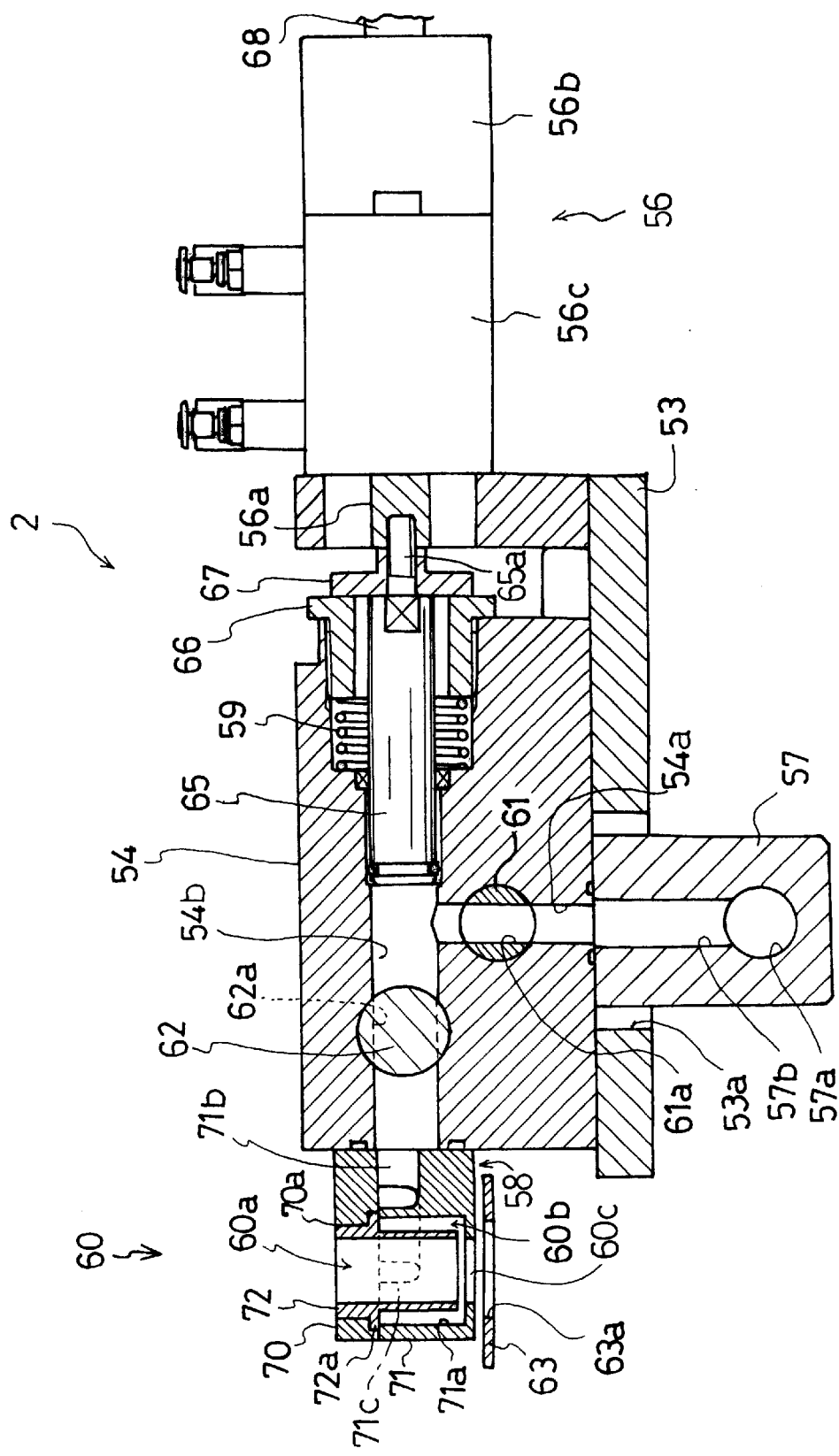
FIG. 9 is an enlarged sectional front vies of the same.

Next, explanation will be given on the coating unit 2 according to FIGS. 1, 7 through 10. As shown in FIG. 1, a base plate 53 is longitudinally spread between the tops of mounting plates 51 erected on the lateral centers of the front and rear sides of the cabinet 10. As shown in FIGS. 7, 8 and 9, on the base plate 53 is fixedly disposed a longitudinally elongated valve casing 54, a valve cylinder 55 and a plurality of thrust cylinders 56. The valve cylinder 55 with a piston rod 55a, which is longitudinally extensible toward the valve casing 54, is disposed in front of the valve casing 54. The thrust cylinders 56 with piston rods 56a, which is laterally extensible toward the valve casing 54, are longitudinally juxtaposed at the right of the valve casing 54. The valve cylinder 55 and the thrust cylinder 56 (consisting of a first cylinder 56b and a second cylinder 56c as discussed below) are pneumatic, electromagnetic, hydraulic or so on. On the left side of the valve casing 54 is fixed a nozzle block 58 forming a plurality of vertical processing nozzles 60 in a longitudinal row. According to this embodiment, the coating unit 2 is provided with eight thrust cylinders 56 and eight processing nozzles 60, both which are as many as the sucking chips 16, so as to coat eight seeds with gel simultaneously. The number of cylinders 56 and nozzles 60 can be changed according to the number of the sucking chips 16.

Both of elongated first valve 61 and second valve 62 in rod-like shapes pass axially slidably and longitudinally through the valve casing 54. A shutter 63 in a horizontal plate-like shape is disposed below the nozzle block 58. The front ends of the first and second valves 61 and 62 and the shutter 63 are fixed onto a connecting member 64 fixed to the piston rod 55a of the valve cylinder 55, so that they are integrally moved longitudinally by the action of the piston rod 55a of the valve cylinder 55, thereby simultaneously operating the opening-and-closing of valve holes 61a and 62a (discussed below) of the first and second valves 61 and 62 and openings 63a (discussed below) of the shutter 63.

A longitudinally long hole 53a is bored vertically through the base plate 53. A longitudinally long gel supplying casing 57 is fixedly hung from the lower surface of the valve casing 54 through the hole 53a. In the gel supplying casing 57 is bored a gel supplying hole 57a in a longitudinal direction, whose rear end opening is connected to an outer gel (coating solution) supplying tank (not shown) through a hose or the like, and are bored a plurality of top-opening gel dividing holes 57b vertically branching from the gel supplying hole 57a at regular intervals.

As shown in FIGS. 6, 7 and others, in the valve casing 54 are bored a plurality of bottom-open vertical first gel passages 54a in a longitudinal row, so as to join the bottom-opening thereof with the top-opening of the gel-dividing holes 57b respectively. In the same are bored a plurality of laterally throughout second gel passages 54b in a longitudinal row. The top ends of the first gel passages 54a join the intermediate portions of the second gel passages 54b respectively. The left openings of the second gel passages 54b are respectively connected to the nozzles 60 of the nozzle block 58 as discussed below. Each of the second gel passage 54b forms at the right side portion thereof a diametrically large plunger chamber 54c which is outwardly open toward the piston rod 56a of the thrust cylinder 56. The first valve 61 crosses the intermediate portions of all the first gel passages 54a and the second valve 62 crosses the intermediate portions of all the second gel passages 54b between their joint portions with the first gel passages 54a and their left ends (toward the nozzles 60). The first valve 61 is bored through by a plurality of vertically diametric valve holes 61a in correspondence to the first gel passages 54a. The second valve 62 is bored through by a plurality of laterally diametric valve holes 62a in correspondence to the second gel passages 54b. The shutter 63 is bored by vertically throughout openings 63a located in relation to gel-membrane holes 71c (discussed below) just under the nozzles 60, as shown in FIG. 7.

The first and second valves 61 and 62 and the shutter 63, which are connected to the connecting member 64, are located so that the resumption of the second gel passages 54b through the valve holes 62a, the overlapping of the gel-membrane holes 71c with the openings 63a and the blocking of the first gel passages 54a by offsetting of the valve holes 61a are performed simultaneously. This situation appears when the piston rod 55a of the valve cylinder 55 is positioned at its first operation position. When the piston rod 55a is at its second operation position, the first valve 61 resumes the first gel passages 54a through the valve holes 61a and the valve holes 62a and the openings 63a are offset so as to shut the second gel passages 54b and the gel-membrane holes 71c, simultaneously.

As shown in FIG. 9, the right portion of the plunger chamber 54c is female-screwed. A cylindrical adjusting bolt 66 having a male screw at its outer periphery and a flange at its outer end is screwed into the female-screwed portion of the plunger chamber 54c. In each of the plunger chambers 54c is disposed a laterally axial plunger 65, which is substantially diametrically as large as the second gel passage 54b, freely through the adjusting bolt 66. The inner (left) end portion of the plunger 65 is slidably inserted into the second gel passage 54b. In the plunger chamber 54c, between the inner (left) end thereof and the inner (left) end of the adjusting bolt 66 is interposed a compression spring 59, which absorbs a shock caused by the abutting of a stopper 67 discussed below against the adjusting bolt 66.

The stopper 67 engages peripherally with a screwed portion 65a co-axially projecting from the outer (right) end of the plunger 65, thereby being able to abut against the flange-like outer end of the adjusting bolt 66. At the outside of the stopper 67, the screwed portion 65b is screwed into the utmost end of the piston rod 56a of each thrust cylinder 56. Accordingly, the plunger 65 and the stopper 67 are operated integrally with the piston rod 56a. The position where the stopper 67 abuts against the adjusting bolt 66 defines the most extension position of the piston rod 56a, which can be adjusted by the rotation of the adjusting bolt 66 for locating its flange, thereby adjusting the stroke of the plunger, that is, the position of the most-advanced inner end of the same defining the amount of discharge of the gelling solution 6. Even if the most-advanced inner end of the plunger 65 is adjusted the most leftwardly (toward the nozzle block 58), it is remains rightward (toward the thrust piston 56) from the joint position of the first and second gel passages 54a and 54b.

The thrust cylinder 56 is so constructed that the piston rod 56a thereof is advanced in several steps. According to this embodiment, as shown in FIG. 9, the thrust cylinder 56 consists of a pair of a first cylinder 56b and a second cylinder 56c in tandem connection, thereby making the piston rod 56a extensible in two steps. At the first step, the first cylinder 56b is actuated so as to advance the piston rod 56a together with a piston (not shown) of the first cylinder 56b. At the second step, the second cylinder 56c is actuated so as to advance the piston rod 56a apart from the first cylinder 56b. The stroke of the first cylinder 56b can be adjusted by rotation of an adjusting bolt 68 attached onto the outer (right) end of the first cylinder 56b.

Explanation will be given on the control of the first and second valves 61 and 62 and the shutter 63 by the valve cylinder 55 and the control of the plungers 65 by the thrust cylinder 56 in one process of feeding the nozzles 60 with the gelling solution 6. At first, in the condition that all the first and second gel passages 54a and 54b are wholly filled with gelling solution 6 from the gel supplying hole 57a, the piston rod 55a of the valve cylinder 55 is located at the first operation position. Hence, the first valve 61, which slides so as to offset the valve holes 61a from the first gel passages 54a, blocks all the first gel passages 54a, thereby preventing the gelling solution 6 from being introduced into the gel supplying casing 57 by the afterward advancing of the plungers 65. Simultaneously, the second valve 62 resumes all the second gel passages 54b through the valve holes 62a thereof. The openings 63a of the shutter 63 are located just under the gel-membrane holes 71c of the nozzles 60 respectively.

In this situation, all the thrust cylinders 56 are actuated simultaneously so as to advance the plungers 65, thereby discharging the gelling solution 6 within the second gel passages 54b into the nozzles 60 respectively. In this regard, at the first operation step of each of the thrust cylinders 56, each of the first cylinder 56b is actuated so as to advance the plunger 65 (leftwardly) a little, thereby pushing out a little gelling solution 6 into the gel-membrane hole 60c at the lower portion of the nozzle 60. As a result, the gelling solution 6 filled in each of the gel-membranes holes 71c becomes a gel-membrane 6a. Then, the seed 5 is released from each of the sucking chips 16 located over the nozzles 60, and is caught on the gel-membrane 6a. Next, at the second step of the thrust cylinder 56, the second cylinder 56c is actuated so as to further advance the plunger 65, thereby expanding the gel-membrane 6b retaining the seed 5 in the nozzle 60 (in the gel-membrane hole 60c). When the thickness of the gel-membrane 6a becomes sufficiently large, the gel-coated seed 7 falls with its own weight from the gel-membrane hole 60c into the hardening unit 3 through the openings 63a of the shutter 63.

Then, the piston rod 55a of the valve cylinder 55 is switched to the second operation position. Hence, the openings 63a of the shutter 63 is offset from the gel-membrane hole 60c, thereby preventing the gelling solution 6 from escaping from the gel-membrane hole 60c. The second valve 62 blocks all the second gel passages 54b, thereby preventing the gelling solution 6 from being discharged to the nozzles 60. The first valve 61 resumes the first gel passage 54a through the valve hole 61a, so as to introduce the gelling solution 6 from the gel supplying hole 57a into the second gel passage 54b before the second valve 62 through the first gel passages 54a, thereby making preparations for the next discharge of the gelling solution 6 to the nozzles 60.

Figure 10:
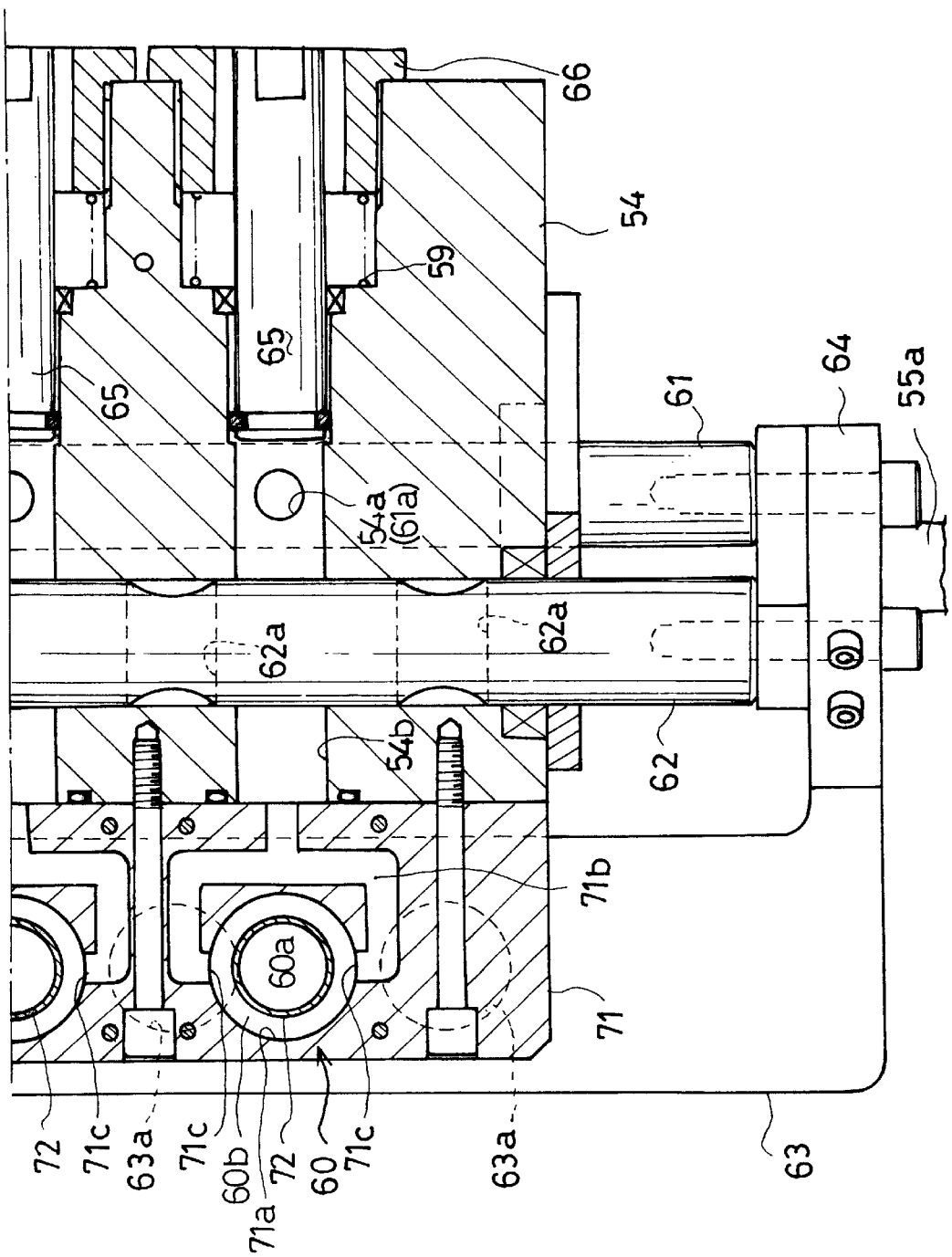
FIG. 10 is a fragmentary sectional plan view of the same.

Next, referring to the nozzle block 58 of the coating unit 2 as shown in FIGS. 9 and 10, it is assembled from an upper casing 70 and a lower casing 71, both of which are fixed onto the left side surface of the valve casing 54 facing the seed supplying unit 1, and nozzle pipes 72 as many as the sucking chips 16. The interior of each nozzle pipe 72 defines a seed passing hole 60a of the nozzle 60. The upper and lower casings 70 and 71 are bored respectively by vertical throughout holes 70a and 71a in a longitudinal row at regular intervals. Each hole 70a is joined with each hole 71a vertically sequentially when the upper and lower casings 70 and 71 are joined with each other. The nozzle pipes 72 are inserted into the respective tandem holes of 70a and 71a. A flange portion 72a is formed by a vertical intermediate portion of each nozzle pipe 72. The outer surface of the upper half portion of the nozzle pipe 72 above the flange portion 72a adheres closely to the wall of the hole 70a. The hole 71a is formed step-wise from a top-opening upper diametrically large portion and a bottom-opening lower diametrically small portion, which are vertically coaxially joined together. The lower half portion of the nozzle pipe 72 below the flange portion 72a is disposed in the diametrically large portion of the hole 71a. The flange portion 72a is placed on the upper surface of the lower casing 71, in other words, the edge of the lower casing 71 around the top opening of the hole 71a, and is suppressed by the bottom of the upper casing 70.

The diameter of the diametrically large portion of the hole 71a is larger than that of the outer periphery of the lower half portion of the nozzle pipe 72 therein, and the bottom thereof is disposed below the bottom of the nozzle pipe 72. The gap between the inner surface of the diametrically large portion of the hole 71a and the outer surface of the nozzle pipe 72 defines a gel chamber 60b of the nozzle 60. The diametrically small portion of the hole 71a serving as a gel-membrane hole 60c is located just under the lower end of the nozzle pipe 72.

Thus, the nozzle 60 is constituted by the nozzle pipe 72 having the seed passing hole 60a, the lower casing 71 having the gel chamber 60b and the gel-membrane hole 60c, and the like, so that the nozzles 60 as many as the sucking chips 16 of the seed supplying unit 1 are formed by the nozzle block 58. Similarly to the sucking chip block 46 of the seed supplying unit 1, the nozzle block 58 can be replaced with another having different nozzles 60, in correspondence to the size or shape of the seeds 5 to be processed.

The lower casing 71 is provided therein with horizontal gel discharge passages 71b interposed between the second gel passages 54b and the gel chamber 60b respectively. The gel discharge passage 71b is connected at the entrance port thereof with the discharge opening (left) end of the second gel passage 54b, separates at the intermediate portion thereof into two longitudinally opposite directions and is connected with the gel chamber 60b through its exit ports 71c disposed oppositely to each other about the axis of the seed passing hole 60a or apart from each other at 180 degrees. The two separations of the gel discharge passage 71b have the same lengths and the same diameters, thereby assuming the gelling solution 6 to flow therethrough in the same quantity and the same pressure.

The gelling solution 6 pushed out from the second gel passage 54b flows horizontally into the gel chamber 60b toward the outer surface of the nozzle pipe 72 through the pair of exit ports 71c in the same quantity and pressure. The both gel-flows from the exit ports 71c diminish each other in pressure and flow into the lower gel-membrane hole 60c. Accordingly, the nozzle pipe 72 is prevented from eccentrically offset caused by the pressure of gelling solution 6, thereby make sure of the seed 5 passing through the seed passing hole 60a properly. Also, the gelling solution 6 evenly flows into the gel-membrane hole 60c, thereby enabling an even gel-membrane 6a to be formed therein. Moreover, the gel-coated seed 7 can be dropped properly vertically from the gel-membrane hole 60c through the opening 63a of the shutter 63, thereby enabling it to surely fall into the space between the paddles 22 in the hardening unit 3 just below the nozzle 60.

The process of seed coating in the nozzle 60 will be described in accordance with FIG. 14. Referring to FIG. 14(a), in the precondition that the whole of the gel discharge passage 71b and the gel chamber 60b is full of the gelling solution 6 and the gel-membrane hole 60c holds therein a gel-membrane 6a as a remaining part of the fed gelling solution 6, the piston rod 55a of the valve cylinder 55 is operated to the second operation position so as to block each of the first gel passages 54a by the first valve 61, resume each of the second gel passages 54b by the second valve 62 and locate the opening 63a of the shutter 63 just under the gel-membrane hole 60c. Then, the thrust cylinder 56 is operated at the first step so as to advance the plunger 65 a little, so that the thickness of gel-membrane 6a is increased as shown in FIG. 14(b), whereby the dropped seed 5 through the seed passing hole 60a can be caught on the gel-membrane 6a without the tear of the gel-membrane 6a causing only the seed 5 to fall into the hardening unit 3.

Referring to FIG. 14(c), the plunger 65 is advanced to the maximum position at the second operation step of the thrust cylinder 56, so that the gelling solution 6 is further pushed out and the gel-membrane 6a swells to a certain thickness while involving the seed 5 and an air bubble. Finally, the weight of gel-membrane 6a can no longer support the weight of the seed 5 and itself, so that the seed 5 with the gel-coat 6b as a gel-coated seed 7 falls to the hardening unit 3 while the gel-coat 6b being ball-like shaped by its surface tension as shown in FIG. 14(c). After that, the piston rod 55a of the valve cylinder 55 is positioned at the first operation position, so that the first valve 61 slides to the closing position, the second valve 62 slides to the opening position and the shutter 63 closes the underbeneath of the gel-membrane hole 60c, and then, the thrust cylinder 56 is returned so as to back off the plunger 65, whereby the second gel passage 54b before the second valve 62 is fed with the gelling solution 6 through the first gel passage 54a, thereby making preparations for the next seed coating in the nozzle 60.

In the nozzle block 58, such a series of process is repeated in each nozzle 60 simultaneously, thereby enabling a large quantity of gel-coated seeds 7 to be produced.

Explanation will next be given on the hardening unit 3 in accordance with FIGS. 11, 12 and 13. A pair of front and rear plates 75 are parallely erected on the cabinet 10. The liquid tank 19 filled with hardening liquid is disposed in a lower half space between both of the plates 75. Above the tank 19 in the space between the plates 75 are parallely longitudinally disposed a driving shaft 76 at the right side end area thereof and a tension shaft 78 at the left side end area thereof. A driven shaft 77, which is longitudinally disposed leftwardly downward from the driving shaft 76 in the same space, is hooked on upper portions of the plates 75. The ends of the driving and driven shafts 76 and 77 are journalled by bearings fixed to the plates 75, and the ends of the tension shaft 78 are journalled by bearings laterally slidably supported by the plates 75.

A front pulley 80 and a wide rear pulley 81 are fixed on the driving shaft 76. A pair of pulleys 82 are fixed front and rear on the driven shaft 77. A pair of pulleys 83 are fixed front and rear on the tension shaft 78. The pair of conveyor belts 21 are tied around the front series of pulleys 80, 82 and 83 and the rear series of pulleys 81, 82 and 83 respectively. The tension shaft 78 is laterally moved by rotation of a bolt 79, thereby adjusting the tension of conveyor belts 21. A mounting plate 86 is laid between the right upper portions of both plates 75. The motor 26 is mounted on the mounting plate 86. A belt 85 is interposed between the pulley 81 and a pulley 84 fixed on a driving shaft of the motor 26.

A plurality of segments 90 are fixed at regular intervals on the outer surface of each conveyor belt 21. The conveyor belts 21 are located so that, when viewed in front, the segments 90 on the front conveyor belt 21 exactly overlap with those of the rear conveyor belt 21. The paddle 22 is fixedly interposed between each pair of front and rear overlapping segments 90 on the front and rear belts 21. When the motor 26 is set off, the upper paddles 22 between the pulleys 80 and 81 and the pulleys 83 vertically overlap with the lower paddles 22 between the pulleys 82 and the pulleys 83, and an interval between laterally adjacent upper paddles 22 and an interval between laterally adjacent lower paddles 22 are located at the vertically downward position from the series of nozzles 60 of the nozzle block 58. The gel-coated seeds 7 dropped from the nozzles 60 as the arrow A in FIG. 11 pass through between the upper adjacent paddles 22 and reach the space between the lower adjacent paddles 22. When one dropping process of the gel-coated seeds 7 from the coating unit 2 is over, the motor 26 is switched on so as to drive the conveyor belts 21 to move as an arrow B in FIG. 11. Hence, the left paddle 22 of the adjacent left and right lower paddles 22 moves while pushing the gel-coated seeds 7 and finally is replaced with the next left paddle 22, then the motor 26 is switched off. In this state, the spaces between the next upper and lower paddles 22 are located just below the nozzles 60, thereby making preparations for the next dropping of the gel-coated seeds 7. During the repeat of such conveying process, the gel-coated seeds 7 are conveyed in the hardening liquid in the tank 19 until they reach the seed discharge hole 20, while the gel-coat 6b of the gel-coated seeds 7 being hardened.

Figure 2:
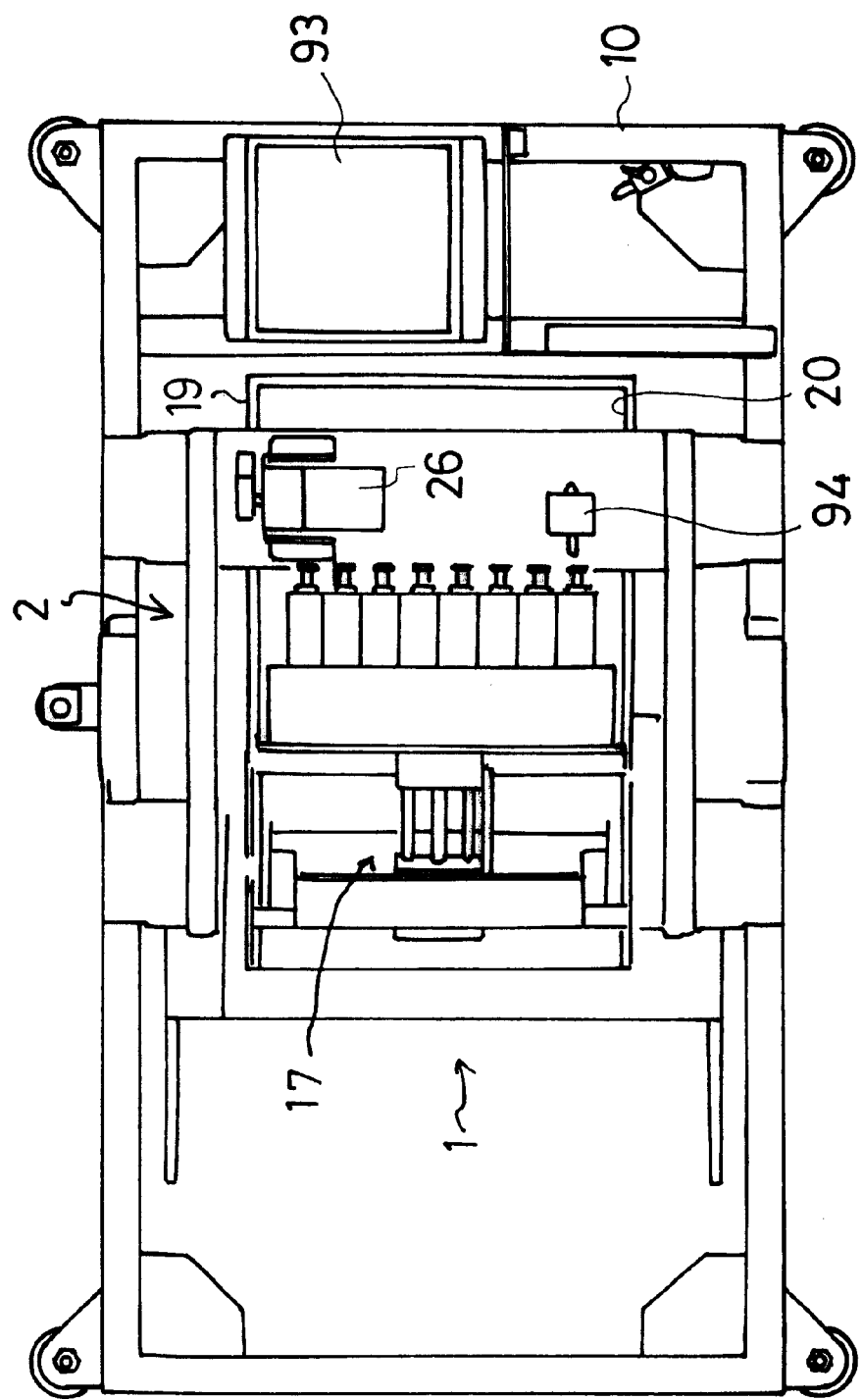
FIG. 2 is a plan view of the same.
Figure 3:
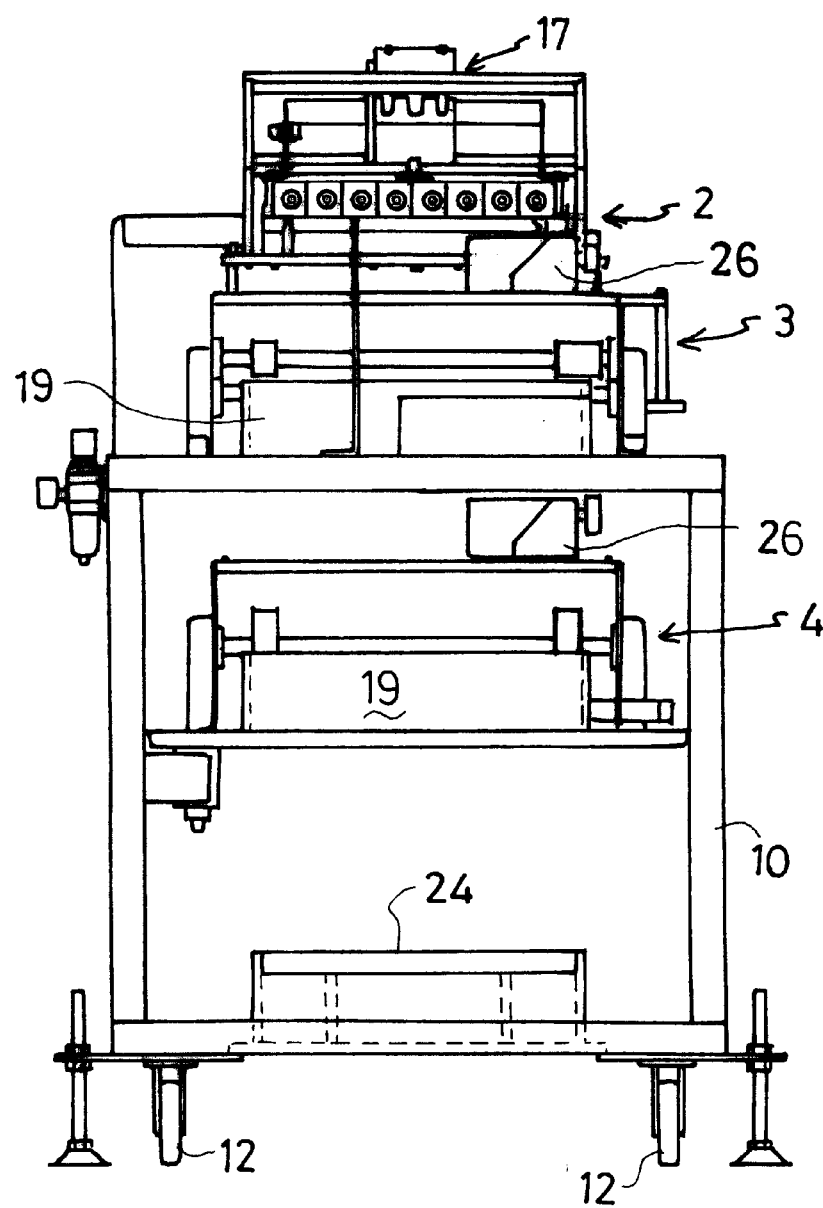
FIG. 3 is a side view of the same.
Figure 11:
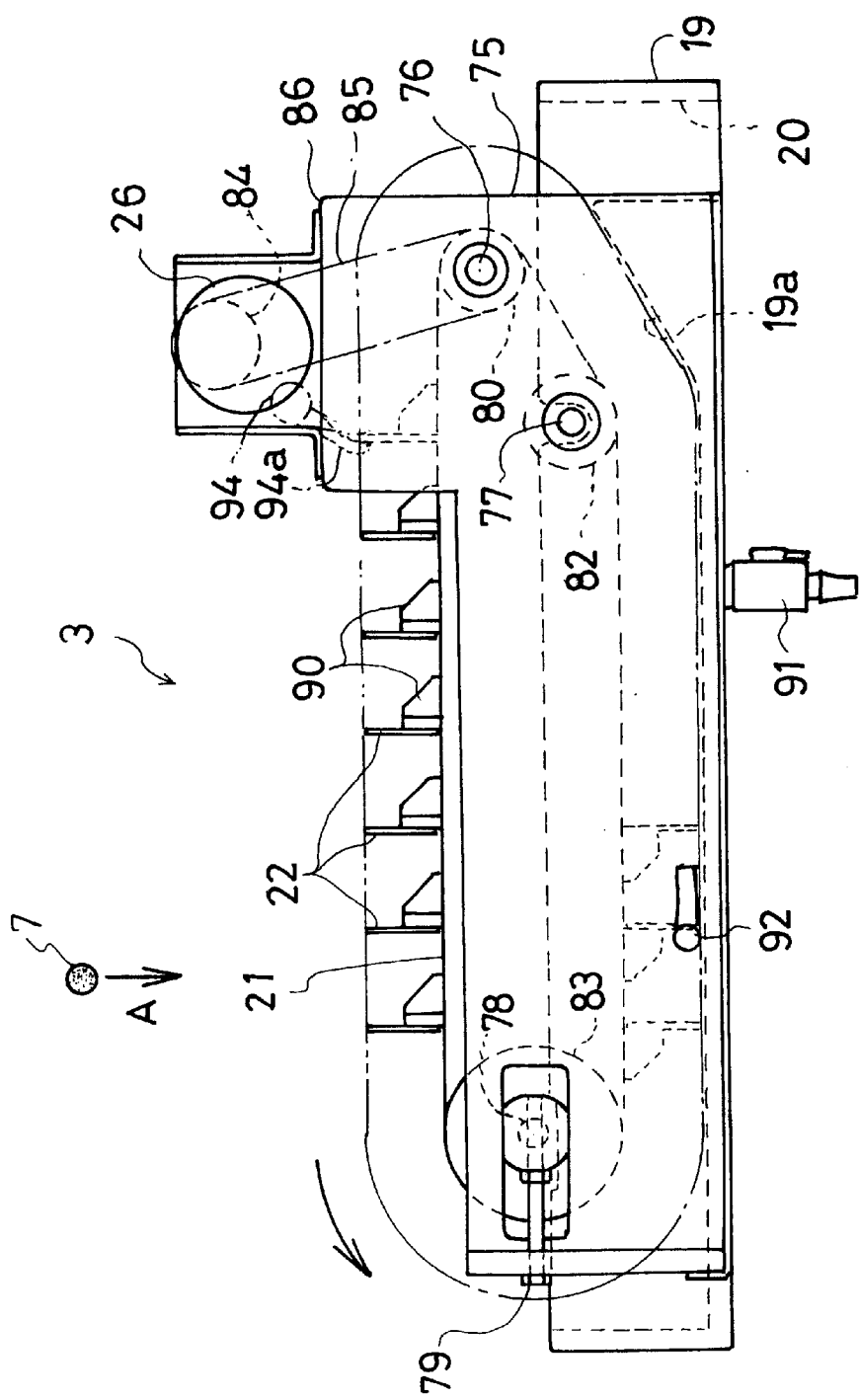
FIG. 11 is a front view of a hardening unit in the apparatus.
Figure 12:
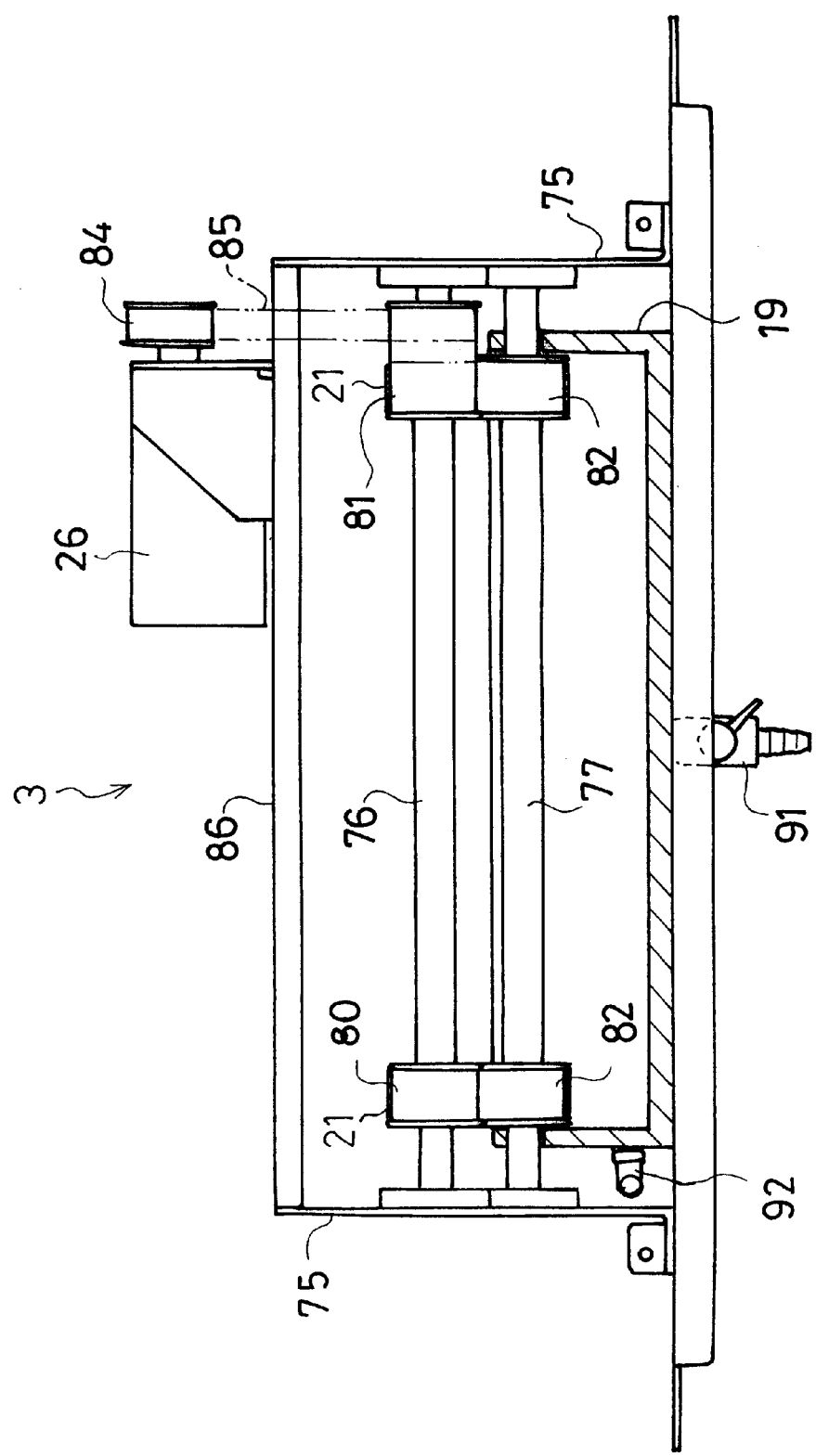
FIG. 12 is a side view partly in section of the same.

As shown in FIGS. 2 and 11, a sensor 94 for detecting the paddle 22 is disposed on the mounting plate 86 so as to control the driving of the conveyor belts 21. When a segment 94a projecting from the sensor 94 abuts against the moving paddle 22, the sensor 94 is switched so as to shut down the motor 26, whereby the conveyor belts 21 stop so that the spaces between the upper paddles 22 and between the lower paddles 22 are exactly located just below the nozzles 60. Then, the thrust cylinders 56 are operated at the second step so as to drop the gel-coated seeds 7 from the nozzles 60 into the tank 19 of the hardening unit 3. The motor 26 is not switched on until a predetermined time after the operation of the thrust cylinders 56, thereby synchronizing the dropping of the gel-coated seeds 7 with the stopping of the conveyor belts 21. Thus, the motor 26 is intermittently driven. The hardening time can be adjusted for adjustment of the hardness degree of the gel-coat 6b of the gel-coated seed 7 by changing the start timing of the motor 26. In this regard, the motor 26 may starts after two or more continuous dropping processes of the gel-coating seeds 7 from the nozzles 60.

As shown in FIGS. 13(a) and 13(b), the paddle 22 is formed in a comb-like shape from a horizontally extending paddle frame 22a substantially as long as the inner width of the tank 19 and paddle teeth 22b vertically projecting from the paddle frame 22a at regular intervals. An interval between adjacent paddle teeth 22b is so narrow as not to allow the gel-coated seed 7 to pass therethrough. The front and rear portions of the paddle frame 22a are attached to the pair of segments 90 on the front and rear conveyor belts 21 respectively, whereby the paddle 22 is longitudinally disposed between the pair of front and rear segments 90. While the paddle teeth 22b or paddle frames 22a of the paddles 22 push the gel-coated seeds 7 during the driving of the conveyor belts 21, the hardening liquid in the tank 19 flows through the spaces between the paddle teeth 22b, thereby diminishing the resistance of the moving paddles 22 against the hardening liquid.

The convention paddle is made of a plate having a plurality slits for allowing the hardening liquid to pass therethrough, so that the utmost end of the paddle is horizontally united in perpendicular to the direction of conveyance, thereby being resistant against the hardening liquid. Such paddles have caused the hardening liquid to flow out together with the gel-coated seeds through a downstream seed discharge hole. When the comb-like paddle 22 of the present invention are used, the hardening liquid can flow through between separate utmost ends of the paddle teeth 22b with a little resistance, thereby being prevented from being pushed out from the seed discharge hole.

The right side end portion of the tank 19 having the bottom-open seed discharge hole 20 is extended outwardly from the right end of the front and rear plates 75. A bottom plate of the tank 19 partly forms an upward slope 19a along the locus of the utmost ends of the paddles 22 of the run of the conveyor belts 21 between the pulleys 83 and the pulleys 80 and 81. The top end of the slope 19a is located above the level surface of the hardening liquid and a vertical wall extends downwardly from the top end of the slope 19a so as to define the left wall of the seed discharge hole 20.

Each group of the gel-coated seeds 7 pushed by each paddle 22 ascend the upward slop 19a. On reaching the top of the slop 19a, the gel-coated seeds 7 escape from the hardening liquid, and fall through the seed discharge hole 20 to the washing unit 4.

Additionally, the tank 19 is provided at the center of the bottom thereof with a draining hole 91. It is also provided at an optional portion of the front surface thereof with a hardening liquid supplying hole 92 which is connected to a reservoir tank 93 disposed on the right upper portion of the cabinet 10 as shown in FIG. 1 through a hose (not shown) for supplying the tank 19 with the hardening liquid.

As shown in FIG. 1, the washing unit 4 is the same however laterally reversed unit of the hardening unit 3. The tank 19 of the washing unit 4 is full of water (or other washing liquid) instead of hardening liquid. The hardening and washing units 3 and 4 share components with each other, thereby reducing tooling cost. However, the motor 26 of the washing unit 4 is not intermittently but continuously driven. For this reason, the gel-coated seeds 7 dropped from the hardening unit 3 have sufficiently hardened gel coats 6b which resist crushing by the paddles 22, and the continuous driving of the motor 26 enhances the washing efficiency.

The guide tube 30 is hung from the bottom opening of the seed discharge hole 20 of the hardening unit 3 so as to locate the lower end thereof just above the upper ends of the upper paddles 22 at the right portion of the washing unit 4, thereby surely guiding the gel-coated seeds 7 into the water in the tank 19 of the washing unit 4 without escape. The gel-coated seeds 7 are conveyed in the tank 19 while the hardening liquid stuck to the gel-coats 6b thereof being washed out by the water therein. Similarly to the hardening unit 3, the gel-coated seeds 7 escapes from the water on the top of the slope 19a and fall through the seed discharge hole 20 into the product container 24 disposed below the washing unit 4.

Regarding to both the hardening unit 3 and the washing unit 4, the comb-like paddles 22 are less resistant against the liquid than the conventional types, thereby preventing the liquid from being pushed out from the respective seed discharge holes. The seed supplying portions of both the units 3 and 4 are not provided laterally outwardly from the most outside paddles 22 but above the paddles 22, so that the units 3 and 4 can be laterally narrowed and the units 2, 3 and 4 can be arranged so as to entirely overlap when viewed in plan, thereby laterally compacting the seed coating apparatus.

As shown in FIG. 1, on a left side portion of the cabinet 10 is disposed a controller box 11 containing a controller, which is electrically connected with the sensors (48, 49, 94 and the like) and the actuators (the cylinders 42, 55 and 56, the motors 26 and the like) of the units 1, 2, 3 and 4 of the apparatus, thereby controlling the operational timing, time scale or the like of the actuators.

What is claimed is:

1. A seed coating apparatus comprising:
   a plurality of parallel nozzles supplied therein with seeds and gelling solution respectively for coating said seeds with said gelling solution;
   a plurality of parallel passages for respectively feeding said nozzles with said gelling solution;
   a single elongated first valve axially slidably crossing upstream portions of all said passages, so as to block-and-resume said upstream portions;

a single elongated second valve axially slidably crossing downstream portions of all said passages, so as to resume-and-block said downstream portions, wherein said first and second valves are joined with each other so as to slide together, so that the blocking-and-resuming of said upstream portions and the resuming-and-blocking of said downstream portions are simultaneously performed, and a plurality of plungers disposed respectively in said passages between said first and second valves for pushing out said gelling solution to said nozzles.

2. The seed coating apparatus according to claim 1, wherein each nozzle comprises: (i) a cylindrical member provided axially in its center, through which a seed passes, and (ii) gel discharge ports for discharging the gelling solution to the nozzle, wherein the gel discharge ports are disposed perpendicular to an axis of the cylindrical member interposed therebetween.

3. The seed coating apparatus according to claim 1, wherein the plunger is capable of being actuated in steps.

4. The seed coating apparatus according to claim 1, wherein each nozzle is provided with a hole through which each seed coated with the gelling solution drops, and the nozzle comprises a shutter for closing the hole, wherein the shutter closes immediately after each seed drops.

5. The seed coating apparatus according to claim 4, wherein the first valve, the second valve, and the shutters are synchronized wherein when the first valve closes, the second valve opens, and the shutters open, while when the first valve opens, the second valve closes, and the shutters close.

6. The seed coating apparatus according to claim 5, further comprising: (a) a tank containing a hardening liquid into which the seeds coated with the gelling solution drop, and (b) a plurality of parallel seed pushing members for aligning and pushing the seeds in the tank, each seed pushing member having a comb shape with (i) a frame extending in a direction perpendicular to a direction of conveying the seeds and (ii) teeth projecting from the frame to align the seeds along the seed pushing member.

7. The seed coating apparatus according to claim 6, wherein the seed pushing members are intermittently activated to receive the seeds dropping from the nozzles between intervals.

8. A seed coating apparatus comprising:

a plurality of parallel nozzles into which seeds and a gelling solution are separately provided to coat the seeds with the gelling solution;

a plurality of parallel passages for providing the gelling solution to the respective nozzles;

a first valve disposed upstream of the passages for closing or opening all of the passages;

a second valve disposed downstream of the passages for closing or opening all of the passages, wherein the first valve and the second valve are synchronized wherein when the first valve opens, the second valve closes, while the first valve closes, the second valve opens; and plungers for pushing the gelling solution, disposed in the respective passages between the first valve and the second valve.

* * * * *